(12) United States Patent
Zhang

(10) Patent No.: US 10,798,218 B2
(45) Date of Patent: Oct. 6, 2020

(54) ENVIRONMENT ISOLATION METHOD AND DEVICE

(71) Applicant: Alibaba Group Holding Limited, Grand Cayman (KY)

(72) Inventor: Songlin Zhang, Zhejiang (CN)

(73) Assignee: Alibaba Group Holding Limited, Grand Cayman (KY)

( * ) Notice: Subject to any disclaimer, the term of this patent is extended or adjusted under 35 U.S.C. 154(b) by 97 days.

(21) Appl. No.: 16/016,389

(22) Filed: Jun. 22, 2018

(65) Prior Publication Data

US 2018/0302500 A1    Oct. 18, 2018

Related U.S. Application Data

(63) Continuation-in-part of application No. PCT/CN2016/109949, filed on Dec. 14, 2016.

(30) Foreign Application Priority Data

Dec. 23, 2015 (CN) .......................... 2015 1 0981192

(51) Int. Cl.
*G06F 15/177* (2006.01)
*G06F 15/16* (2006.01)
(Continued)

(52) U.S. Cl.
CPC ............... *H04L 67/40* (2013.01); *G06F 8/00* (2013.01); *G06F 9/547* (2013.01); *G06F 16/951* (2019.01);
(Continued)

(58) Field of Classification Search
CPC . H04L 67/40; H04L 63/0236; H04L 61/2061; G06F 9/547
(Continued)

(56) References Cited

U.S. PATENT DOCUMENTS 6,434,627 B1 * 8/2002 Millet .................... H04L 61/25
709/245
8,326,943 B2 * 12/2012 Chinta ................... G06F 21/53
709/203
(Continued)

FOREIGN PATENT DOCUMENTS

CN          1889048 A      1/2007
CN        101233731 A      7/2008
(Continued)

OTHER PUBLICATIONS

Translation of International Search Report from corresponding PCT Application No. PCT/CN2016/109949, dated Mar. 7, 2017, 2 pages.
(Continued)

*Primary Examiner* — Bharat Barot
(74) *Attorney, Agent, or Firm* — Lee & Hayes, P.C.

(57) ABSTRACT

The present application discloses an environment isolation method. First, a pre-configured full address in a routing address pool in a Remote Procedure Call (RPC) client terminal is automatically refreshed according to a preset cycle. The RPC client terminal stops automatic refresh in the routing address pool after receiving an environment isolation instruction sent by an environment isolation device, and replaces a current address in the routing address pool with a combined address. When subsequently receiving a service call request sent by a user, the RPC client terminal generates a valid target address based on the combined address in the routing address pool, sends the service call request to an RPC server terminal corresponding to the target address, and returns to the user a service processing result returned by the RPC server terminal.

20 Claims, 10 Drawing Sheets

(51) Int. Cl.
  *H04L 29/06*   (2006.01)
  *G06F 16/951*  (2019.01)
  *G06F 8/00*    (2018.01)
  *G06F 9/54*    (2006.01)
  *H04L 12/24*   (2006.01)
  *H04L 29/12*   (2006.01)

(52) U.S. Cl.
  CPC .......... *H04L 29/06* (2013.01); *H04L 41/0816* (2013.01); *H04L 61/2061* (2013.01); *H04L 63/0236* (2013.01); *H04L 61/1541* (2013.01)

(58) Field of Classification Search
  USPC ................. 709/220–222, 245–246, 202–203
  See application file for complete search history.

(56) References Cited

U.S. PATENT DOCUMENTS

| | | | |
|---|---|---|---|
| 8,589,554 B2 * | 11/2013 | Kelkar | G06F 9/5072 |
| | | | 709/226 |
| 9,813,374 B1 * | 11/2017 | Magerramov | H04L 61/2061 |
| 10,225,331 B1 * | 3/2019 | Freitas | H04L 61/2007 |
| 10,621,001 B1 * | 4/2020 | Braverman | G06F 21/53 |
| 2007/0283367 A1 | 12/2007 | Brabson et al. | |
| 2012/0324483 A1 | 12/2012 | Bello et al. | |
| 2014/0056121 A1 * | 2/2014 | Johnsen | H04L 69/40 |
| | | | 370/216 |

FOREIGN PATENT DOCUMENTS

| | | |
|---|---|---|
| CN | 101282232 A | 10/2008 |
| CN | 104468822 A | 3/2015 |

OTHER PUBLICATIONS

Translation of Written Opinion from corresponding PCT Application No. PCT/CN2016/109949, dated Mar. 7, 2017, 6 pages.
Anonymous, "Deployment environment—Wikipedia", Dec. 17, 2015, Retrieved from the InternetURL: https://en.wikipedia.org/w/index.phptitle=Deploymentenvironment&oldid=695632071, on Jul. 3, 2019, 15 pages.
Anonymous, "Remote procedure call—Wikipedia", Dec. 16, 2015, Retrieved from the Internet: URL:https://en.wikipedia.org/w/index.php?title=Remote procedure call&oldid=695470540 , retrieved on Jul. 3, 2019, 15 pages.
Translation of CN Office Action from Corresponding CN Application No. 201510981192.3 dated Aug. 27, 2019, a counterpart foreign application for U.S. Appl. No. 16/016,389 , 5 pafes.
Translation of CN Search Report from Corresponding CN Application No. 201510981192.3 dated Aug. 7, 2019, a counterpart foreign application for U.S. Appl. No. 16/016,389 , 2 pages.
The Extended European Search Report dated Jul. 11, 2019 for European Patent Applicaiton No. 1687768.3, 7 pages.
European Summons to Attend Oral Proceedings dated Jun. 26, 2020 for European Patent Application No. 16877638.3, a counterpart of U.S. Appl. No. 16/016,389, 6 pages.

* cited by examiner

ENVIRONMENT ISOLATION METHOD AND DEVICE

CROSS REFERENCE TO RELATED PATENT APPLICATIONS

This application claims priority to and is a continuation of PCT Patent Application No. PCT/CN2016/109949, filed on 14 Dec. 2016, which claims priority to Chinese Patent Application No. 201510981192.3, filed on 23 Dec. 2015 and entitled "ENVIRONMENT ISOLATION METHOD AND DEVICE", which are incorporated herein by reference in their entirety.

TECHNICAL FIELD

The present application relates to the field of communications technologies, and in particular, to environment isolation methods. The present application also relates to Remote Procedure Call (RPC) client terminals and environment isolation devices.

BACKGROUND

RPC is a Client-Server protocol for distributed computing. By means of RPC, a service can be requested from a remote computer program without the knowledge of an underlying network technology. Therefore, RPC is simple and popular. When using RPC, usually, a client terminal sends a request to a server terminal to execute a number of procedures, and the server terminal uses parameters provided by the client terminal and returns an execution result to the client terminal. At present, the public cloud computing products of most of the cloud computing platforms provide an RPC service function, so that developers of various types of languages can use the public cloud computing products quickly.

FIG. 1 illustrates the principles of RPC. An RPC client terminal 100 and an RPC server terminal 102 are connected to each other in various frequency bands 108 using respective transmission code 104 and 106 via the RPC protocol 108. The client terminal 100 has an interface module 110. The server 102 has an implementation module 112 for performing tasks. By means of RPC, a multi-processor environment (for example, a plurality of servers connected via a local area network) of a non-shared memory can be fully utilized. As such, an application (APP) can be easily distributed on a plurality of servers in a way that it appears to be running on a computer having a plurality of processors. Technical personnel can conveniently facilitate the sharing of procedure codes, thus improving the utilization rate of system resources. In addition, a large number of data processing operations can be distributed to and run in a cluster having a relatively superior processing capability, reducing the workload of a single node and, at the same time, achieving better service processing.

In the process of applying the RPC technology, a client in an RPC framework needs to call a server. There are different policies and implementations for routing a request to a server. Accordingly, how to achieve environment isolation based on request routing technology is an unavoidable issue in the existing RPC application process.

Environment isolation means distinguishing distributed call services and data in a test environment from those in a production environment by certain means (e.g., the request routing technology herein) to avoid cross interference and use of distributed call services and data between the different environments. Generally, a request is isolated to a specified machine by modifying a request source flag (IP). Or a request is isolated to a specified machine or cluster by adjusting a weight configuration for load balance (there may be a problem of incomplete isolation). Or a machine is isolated to a specified group by configuring a group value of hybrid routing (a service group needs to be set on a server terminal to distinguish from the other groups).

FIG. 2 is a schematic diagram of an isolation architecture based on request routing. Modules such as a uniform access module 1 (200), a service configuration module 1 (202), and a notification module (204) are correspondingly pre-configured for different APPs (collectively as 206) in a production environment 208, while modules such as a uniform access module 2 (210) and a service configuration module 2 (212) different from those in the production environment 208 are correspondingly configured for APPs (collectively as 214) in an isolated environment 216. However, the production environment 208 and the isolated environment 216 are both managed by a uniform management platform 218. Environment isolation based on request routing requires a modification on a client terminal request flag (IP) or a modification on an RPC route configuration file, which inevitably leads to a need to release and restart APPs, resulting in high operation cost and a failure in achieving isolation dynamically. Moreover, a server terminal needs to configure a separate group to support the isolation operation. Such operations are very complex and error-prone, and an erroneous configuration may cause problems such as incomplete isolation. Uncertainties such as fluctuation of the overall environment can easily cause failure of a service request call, affecting the security and stability of the environment. Therefore, if test comparison needs to be performed through environment isolation, it is generally necessary to deploy an identical set of APPs and set different route configurations and groups. However, the environment deployed separately may not be completely authentic, and can also increase the operation and maintenance workload of the operator.

The existing environment isolation solutions described above have the following disadvantages:

(1) Severe Intrusion into APPs

The conventional isolation technology requires either modifying an original application code, group, or routing rule configuration or performing a group configuration for a service of a service provider. APPs are severely intruded, and the configuration is complex and error-prone. Additionally, the modified version needs to be split separately, and subsequent maintenance costs are also high.

(2) Threat to the Stability of the APP after Isolation

A stability problem in a link after isolation directly causes a dependent upper-layer system service to be unavailable. The conventional isolation technology does not provide a link availability check function or a disaster recovery policy for a service request failure occurring after isolation. Moreover, disaster recovery cannot be performed quickly due to the mechanism of the existing solutions.

(3) High Deployment Costs

The isolation implemented through hardware routing requires additional devices. The actual deployment costs are extremely high. Only professionals can operate the device, while developers and testers cannot operate the device as needed. An operation to modify an isolation rule is complex and error-prone. Moreover, some excessive additional functions are typically not used, which can be wasteful.

(4) Poor Environment Authenticity after Isolation

Conventional isolation based on request routing needs to modify a configuration file or separately deploy a set of APPs. Therefore, there are differences between an isolated environment and an original production environment in terms of authenticity. The environment difference is present in tests or other contrast verifications, even though isolation is intended for directed diversion rather than changing the environment. Moreover, there also exists the disadvantage of high costs associated with subsequent maintenance, because a uniform configuration of the production environment cannot be directly applied to the isolated β environment.

(5) Complex Operations and Poor Real-Time Performance

In the conventional isolation solution based on request routing, modifications to the APPs and the configurations inevitably result in redeployment or restart of the APPs. Consequently, the overall operation chain is long and time-consuming, the operations are time-consuming and cannot take effect quickly in real time. A large number of configurations need to be prepared, and cost for keeping the configurations available is high.

As such, how to implement environment isolation and reduce the isolation costs and isolation operation complexity while ensuring the security and stability becomes a technical problem that urgently needs to be resolved by technicians in this field.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

The present application discloses an environment isolation method that can minimize the labor and hardware costs of environment isolation while improving the real-time performance, security, and the stability of the environment isolation. The method is applied to an RPC client terminal. An environment isolation device connected to the RPC client terminal is preset. A pre-configured full address in a routing address pool in the RPC client terminal is automatically refreshed according to a preset cycle. The method includes:
  receiving, by the RPC client terminal, an environment isolation instruction sent by the environment isolation device;
  stopping, by the RPC client terminal, an automatic refresh of the routing address pool, and replacing a current address in the routing address pool with a combined address, wherein the combined address is generated by the RPC client terminal by combining the current address in the routing address pool and an address in a preset manual address list;
  generating, by the RPC client terminal, a valid target address based on the combined address in the routing address pool when receiving a service call request sent by a user; and
  sending, by the RPC client terminal, the service call request to an RPC server terminal corresponding to the target address, and returning to the user a service processing result returned by the RPC server terminal.

The manual address list includes addresses of an RPC client terminal and an RPC server terminal that participate in environment isolation, and the step of replacing, by the RPC client terminal, a current address in the routing address pool with a combined address includes:
  selecting a first sub-address that can be used for address combination from the manual address list;
  using an address in the routing address pool, after the automatic refresh is stopped, as a second sub-address;
  combining the first sub-address and the second sub-address into the combined address based on a preset address combination algorithm; and
  deleting the current address from the routing address pool, and adding the combined address to the routing address pool.

The step of generating, by the RPC client terminal, a valid target address based on the combined address in the routing address pool includes:
  querying a preset routing rule, and querying the routing address pool for available device addresses;
  screening the found device addresses according to the routing rule;
  if there is a device address conforming to the routing rule, using the device address as the target address; or
  if there is no device address conforming to the routing rule, returning a service call failure response to the user.

After the step of replacing, by the RPC client terminal, a current address in the routing address pool with a combined address, the method further includes:
  returning an environment isolation success response to the environment isolation device; and
  querying whether an interface between the RPC client terminal and each downstream RPC server terminal is normal when receiving an isolation status check instruction sent by the environment isolation device, and sending a query result to the environment isolation device to cause the environment isolation device to return the query result to the user.

After the step of replacing, by the RPC client terminal, a current address in the routing address pool with a combined address, the method further includes:
  refreshing the combined address in the routing address pool with the full address if receiving an environment isolation cancellation instruction sent by the environment isolation device, and automatically refreshing the pre-configured full address in the routing address pool according to a preset cycle.

Correspondingly, the present application further provides an environment isolation method. The method is applied to an environment isolation device connected to the RPC client terminal. The method includes:
  determining, based on address information carried in an environment isolation request sent by a user, an RPC client terminal that requires environment isolation, wherein a pre-configured full address in a routing address pool at the RPC client terminal is automatically refreshed according to a preset cycle; and
  sending an environment isolation instruction to the RPC client terminal, so that the RPC client terminal stops an automatic refresh of the routing address pool, and replaces a current address in the routing address pool with a combined address, wherein the combined address is generated by the RPC client terminal by combining the current address in the routing address pool and an address in a preset manual address list.

The address information is a source IP address and a destination IP address, and the step of determining, based on address information carried in an environment isolation request sent by a user, an RPC client terminal that requires environment isolation includes:
- extracting the address information from the environment isolation request;
- obtaining a service requiring environment isolation by querying an interface of an RPC server terminal; and
- using an RPC client terminal corresponding to the source IP address as the RPC client terminal that requires environment isolation.

After the step of sending an environment isolation instruction to the RPC client terminal, the method further includes:
- sending an isolation status check instruction to the RPC client terminal if an environment isolation success response sent by the RPC client terminal is received, and returning to the user a query result returned by the RPC client terminal, wherein the status check instruction is used to instruct the RPC client terminal to query whether an interface between the RPC client terminal and each downstream RPC server terminal is normal, and to send the query result to the environment isolation device.

After the step of sending an environment isolation instruction to the RPC client terminal, the method further includes:
- detecting whether each downstream RPC server terminal of the RPC client terminal is in a normal state if an environment isolation success response sent by the RPC client terminal is received, and determining whether the combined address in the routing address pool after screening according to a preset routing rule is null; and
- sending a downstream survival security alarm prompt to the user if there is a downstream RPC server terminal in an abnormal state or the combined address in the routing address pool after screening according to the preset routing rule is null.

After the step of sending an environment isolation instruction to the RPC client terminal, the method further includes:
- sending an environment isolation cancellation instruction to the RPC client terminal when receiving an environment isolation cancellation request sent by the user, so that the RPC client terminal refreshes the combined address in the routing address pool with the full address, and automatically refreshes the pre-configured full address in the routing address pool according to a preset cycle.

Correspondingly, the present application further provides an RPC client terminal. The RPC client terminal is connected to a preset environment isolation device, and a pre-configured full address in a routing address pool in the RPC client terminal is automatically refreshed according to a preset cycle. The RPC client terminal further includes:
- a receiving module configured to receive an environment isolation instruction sent by the environment isolation device;
- a replacement module configured to stop an automatic refresh of the routing address pool at the RPC client terminal, and replace a current address in the routing address pool with a combined address, wherein the combined address is generated by the RPC client terminal by combining the current address in the routing address pool and an address in a preset manual address list;
- a generation module configured to generate a valid target address based on the combined address in the routing address pool when the receiving module receives a service call request sent by a user; and
- a sending module configured to send the service call request to an RPC server terminal corresponding to the target address, and returning to the user a service processing result returned by the RPC server terminal.

The manual address list includes addresses of an RPC client terminal and an RPC server terminal that participate in environment isolation, and when replacing the current address in the routing address pool with the combined address, the replacement module is configured to:
- select a first sub-address that can be used for address combination from the manual address list;
- use an address in the routing address pool, after automatic refresh is stopped, as a second sub-address;
- combine the first sub-address and the second sub-address into the combined address based on a preset address combination algorithm; and
- delete the current address from the routing address pool, and add the combined address to the routing address pool.

The generation module is configured to:
- query a preset routing rule, and query the routing address pool for available device addresses;
- screen the obtained device addresses according to the routing rule;
- if there is a device address conforming to the routing rule, use the device address as the target address; or
- if there is no device address conforming to the routing rule, return a service call failure response to the user.

The RPC client terminal further includes:
- a response module configured to return an environment isolation success response to the environment isolation device; and
- a query module configured to query whether an interface between the RPC client terminal and each downstream RPC server terminal is normal when an isolation status check instruction sent by the environment isolation device is received, and send a query result to the environment isolation device to cause the environment isolation device to return the query result to the user.

The RPC client terminal further includes:
- a withdrawal module configured to refresh the combined address in the routing address pool with the full address when an environment isolation cancellation instruction sent by the environment isolation device is received, and automatically refresh the pre-configured full address in the routing address pool according to a preset cycle.

Correspondingly, the present application further provides an environment isolation device. The environment isolation device is connected to the RPC client terminal, and the environment isolation device includes:
- a determining module configured to determine, based on address information carried in an environment isolation request sent by a user, an RPC client terminal that requires environment isolation, wherein a pre-configured full address in a routing address pool in the RPC client terminal is automatically refreshed according to a preset cycle; and
- a sending module configured to send an environment isolation instruction to the RPC client terminal, so that the RPC client terminal stops an automatic refresh of the routing address pool, and replaces a current address in the routing address pool with a combined address, wherein the combined address is generated by the RPC client terminal by combining the current address in the routing address pool and an address in a preset manual address list.

The address information is a source IP address and a destination IP address, and the determining module is configured to:

extract the address information from the environment isolation request;

obtain a service requiring environment isolation by querying an interface of an RPC server terminal; and use an RPC client terminal corresponding to the source IP address as the RPC client terminal that requires environment isolation.

The environment isolation device further includes:

a first detection module configured to send an isolation status check instruction to the RPC client terminal when an environment isolation success response sent by the RPC client terminal is received, and return to the user a query result returned by the RPC client terminal, wherein the status check instruction is used to instruct the RPC client terminal to query whether an interface between the RPC client terminal and each downstream RPC server terminal is normal, and send the query result to the environment isolation device.

The environment isolation device further includes:

a second detection module configured to detect whether each downstream RPC server terminal of the RPC client terminal is in a normal state when an environment isolation success response sent by the RPC client terminal is received, and determine whether the combined address in the routing address pool after screening according to a preset routing rule is null; and send a downstream survival security alert to the user when there is a downstream RPC server terminal in an abnormal state or the combined address in the routing address pool after screening according to the preset routing rule is null.

The environment isolation device further includes:

a withdrawal module configured to send an environment isolation cancellation instruction to the RPC client terminal when an environment isolation cancellation request sent by the user is received, so that the RPC client terminal refreshes the combined address in the routing address pool with the full address, and automatically refreshes the pre-configured full address in the routing address pool according to a preset cycle.

As can be seen, by means of the technical solutions of the present application, first, a pre-configured full address in a routing address pool in an RPC client terminal is automatically refreshed according to a preset cycle. The RPC client terminal stops the automatic refresh of the routing address pool after receiving an environment isolation instruction sent by an environment isolation device, and replaces a current address in the routing address pool with a combined address. When subsequently receiving a service call request sent by a user, the RPC client terminal generates a valid target address based on the combined address in the routing address pool, sends the service call request to an RPC server terminal corresponding to the target address, and returns to the user a service processing result returned by the RPC server terminal. As such, problems such as high complexity and incomplete isolation of environment isolation in an RPC call process are resolved without any hardware modification, ensuring the security and stability of the environment isolation.

DETAILED DESCRIPTION

In view of the problems discussed above relating to an existing request-routing-based isolation model, the present application provides an environment isolation method with respect to the existing RPC request routing model. The method is applied to an RPC client terminal. To enable a user to implement environment isolation of the RPC client terminal, an environment isolation device connected to the RPC client terminal is additionally arranged in the present application. In one embodiment of the present application, the environment isolation device can be combined with functions of a visualization platform and set as an isolation console. The isolation console can visually display an upstream-downstream relationship between the RPC client terminal and a RPC server terminal, and provide an isolation call operation to the user (technical personnel). In addition, because an address needs to be acquired subsequently by using a routing address pool in the RPC client terminal, a pre-configured full address in the routing address pool is set to be automatically refreshed according to a preset cycle (an address in a routing address pool of an existing RPC client terminal is fixed and cannot be modified) according to the technical solutions of the present application. The full address is an address applied to all current devices (including devices that participate in isolation and devices that do not participate in isolation). The full address is preset and fixed.

Figure 1:
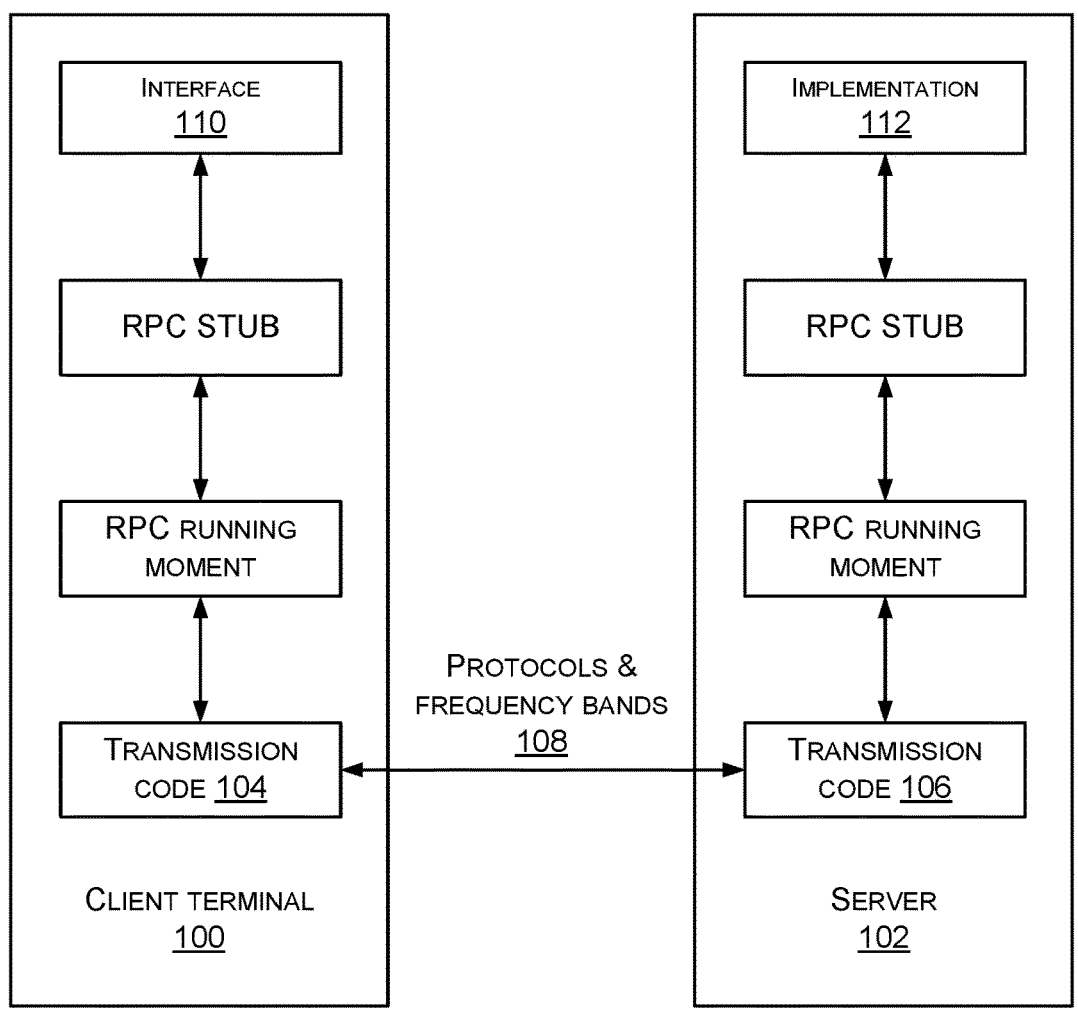
FIG. 1 is a schematic diagram illustrating the principles of RPC.
Figure 2:
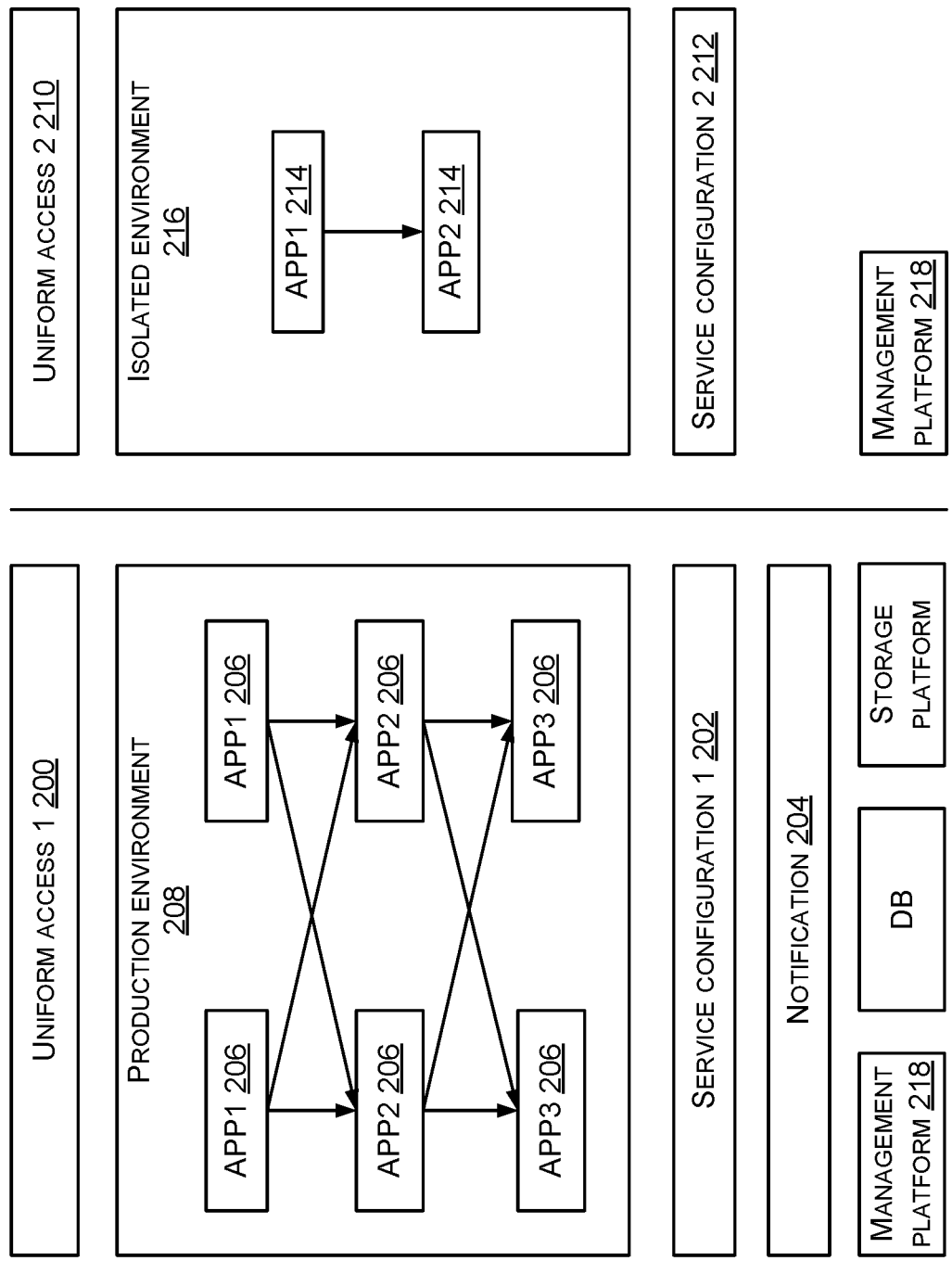
FIG. 2 is a schematic diagram of an isolation architecture based on request routing.
Figure 3:
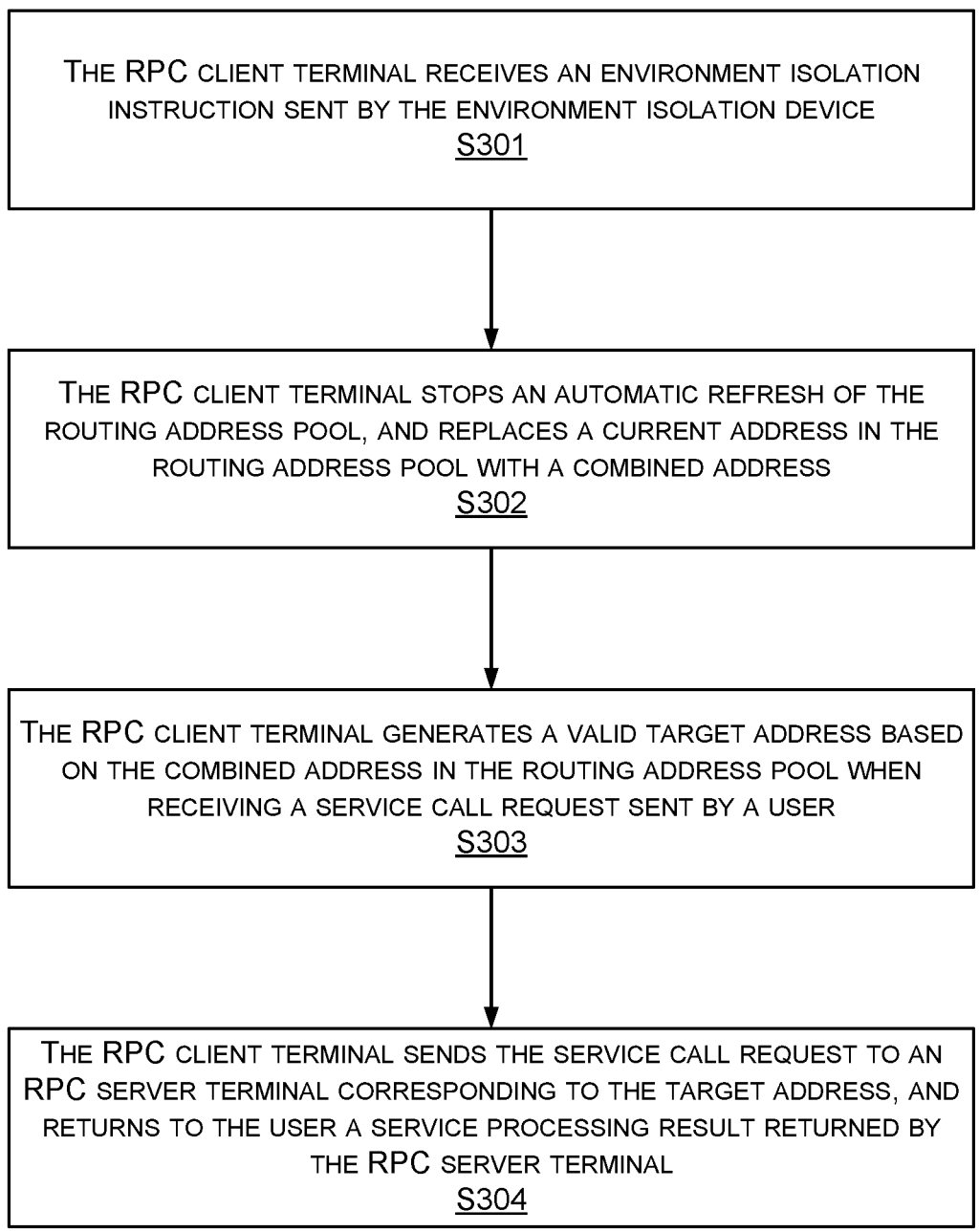
FIG. 3 is a schematic flowchart of an environment isolation method according to an embodiment of the present application.

FIG. 3 is a schematic flowchart of an environment isolation method according to the present application. The method includes the following steps:

S301. The RPC client terminal receives an environment isolation instruction sent by the environment isolation device.

To maintain the authenticity and security of an isolated environment, the user sends a request to the environment isolation device when needing to initiate environment isolation. After determining the corresponding RPC client terminal based on address information carried in the request, the environment isolation device sends an environment isolation instruction to the RPC client terminal.

S302. The RPC client terminal stops an automatic refresh of the routing address pool, and replaces a current address in the routing address pool with a combined address.

Different from the conventional isolation solution in which a routing rule is modified, the technical solutions of the present application primarily modify the routing address pool of the RPC client terminal. To that end, a manual address list is preset in the technical solutions of the present application. The manual address list includes addresses of an RPC client terminal and an RPC server terminal that participate in environment isolation. The manual address list may be set by using the environment isolation device, and may be modified by technical personnel using the environment isolation device.

The RPC client terminal generates the combined address by combining the current address in the routing address pool of the RPC client terminal and an address in the preset manual address list, and replaces the original address in the routing address pool with the combined address. In an embodiment of the present application, the steps are as follows:

Step a). A first sub-address that can be used for address combination is selected from the manual address list.

Step b). An address in the routing address pool, when the automatic refresh is stopped, is used as a second sub-address.

Step c). The first sub-address and the second sub-address are combined into the combined address based on a preset address combination algorithm.

Step d). The current address is deleted from the routing address pool, and the combined address is added to the routing address pool.

In the steps above, the manually set address and the automatically refreshed full address are combined quickly and effectively based on the address combination algorithm, without affecting grouping. After the combined address is obtained, environment isolation can be completed subsequently based on an RPC request routing function. The process is simple with minimal modifications, and without affecting the routing-layer files, thus avoiding errors.

In an embodiment of the present application, after the steps are completed, to inform the user of the current environment isolation progress, the RPC client terminal returns an environment isolation success response to the environment isolation device. After receiving the environment isolation success response, the environment isolation device returns the environment isolation success response to the user, and at the same time, instructs the RPC client terminal to check an isolation status, to ensure the stability of an isolated environment. Therefore, the RPC client terminal queries whether an interface between the RPC client terminal and each downstream RPC server terminal is normal when receiving an isolation status check instruction sent by the environment isolation device, and sends a query result to the environment isolation device to allow the environment isolation device to return the query result to the user.

S303. The RPC client terminal generates a valid target address based on the combined address in the routing address pool when receiving a service call request sent by a user.

There may be a plurality of combined addresses in the routing address pool, and different routing rules need to be used depending on different actual application scenarios (the routing rules are generally stored in the client terminal, and need to be updated by technical personnel, and are not in one-to-one correspondence with IP addresses; but there are some general match rules between the routing rules and the IP addresses). Therefore, in the process of obtaining the valid target address based on the combined address, the combined addresses need to be screened by using a preset routing rule. Specifically, in one embodiment of the present application, first, the preset routing rule is queried, and the routing address pool is queried for available device addresses. Then, the obtained device addresses are screened according to the routing rule. If there is a device address conforming to the routing rule, the device address is used as the target address; if there is no device address conforming to the routing rule, a service call failure response is returned to the user.

Figure 4:
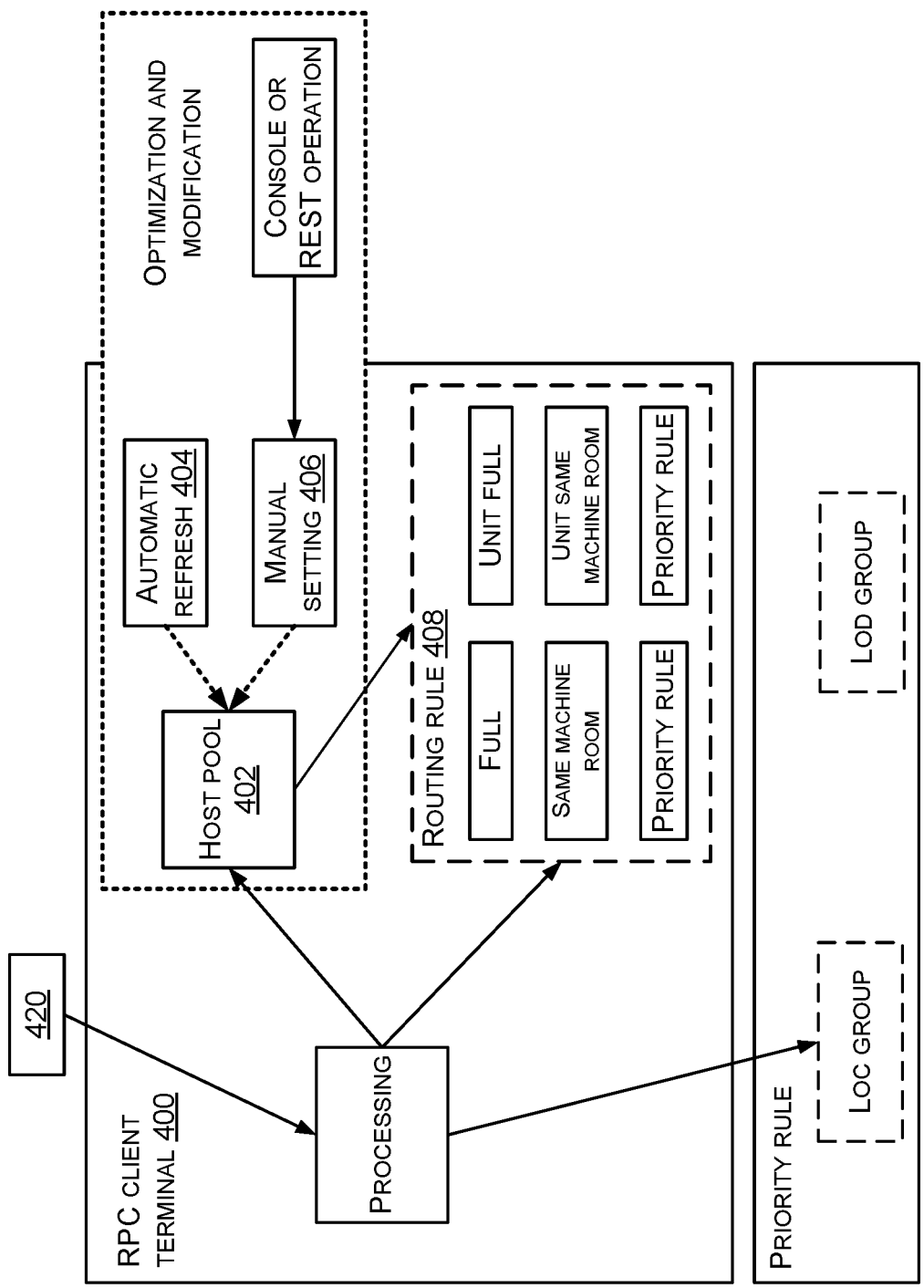
FIG. 4 is a schematic diagram of an isolation optimization solution according to an embodiment of the present application.

With reference to a schematic diagram of an isolation optimization solution shown in FIG. 4, a process of the isolation optimization solution in the embodiment is as follows:

Step a). A user 420 sends a service request to the RPC client terminal 400. The RPC client terminal 400 can query the routing address pool 402 for available combined addresses and a routing rule 408.

Step b). If the user has started isolation by using the environment isolation device, an automatic refresh 404 of the routing address pool 402 of the RPC client terminal 400 would be disabled beforehand. A manually-set address list 406 is read. The manually-set address list 406 and a full address in the routing address pool 402 at the time when the automatic refresh 404 is stopped are quickly combined based on an address combination algorithm. Then a valid target address can be obtained after the combined addresses in the routing address pool 402 are filtered according to various routing rules 408. It is also possible that the combined address is null because the condition is not satisfied (no downstream APP exists).

S304. The RPC client terminal 400 sends the service call request to an RPC server terminal corresponding to the target address, and returns to the user a service processing result returned by the RPC server terminal 400.

The environment isolation optimization solution described in S301 to S304 effectively improves the real-time performance, security, and stability of isolation and the authenticity of an isolated environment, and, at the same time, reduces costs and simplifies operations. When the isolation needs to be canceled subsequently, the user also sends an environment isolation cancellation instruction to the RPC client terminal by using the environment isolation device. Correspondingly, the RPC client terminal 400 refreshes the combined address in the routing address pool 402 with the full address after receiving the environment isolation cancellation instruction sent by the environment isolation device, and automatically refreshes the pre-configured full address in the routing address pool 402 according to a preset cycle.

In the embodiment of S304, after determining the valid target address, the RPC client terminal sends a request to a server terminal, and receives a result back from the server terminal, thus completing this service call of the user. If the user needs to cancel isolation subsequently, it is only necessary to resume the automatic refresh of the address pool. The original address will be refreshed with the full address. As such, a next request will not be directed. In other words, the environment isolation cancellation operation does not require any cleanup work, and is simple and efficient.

Figure 5:
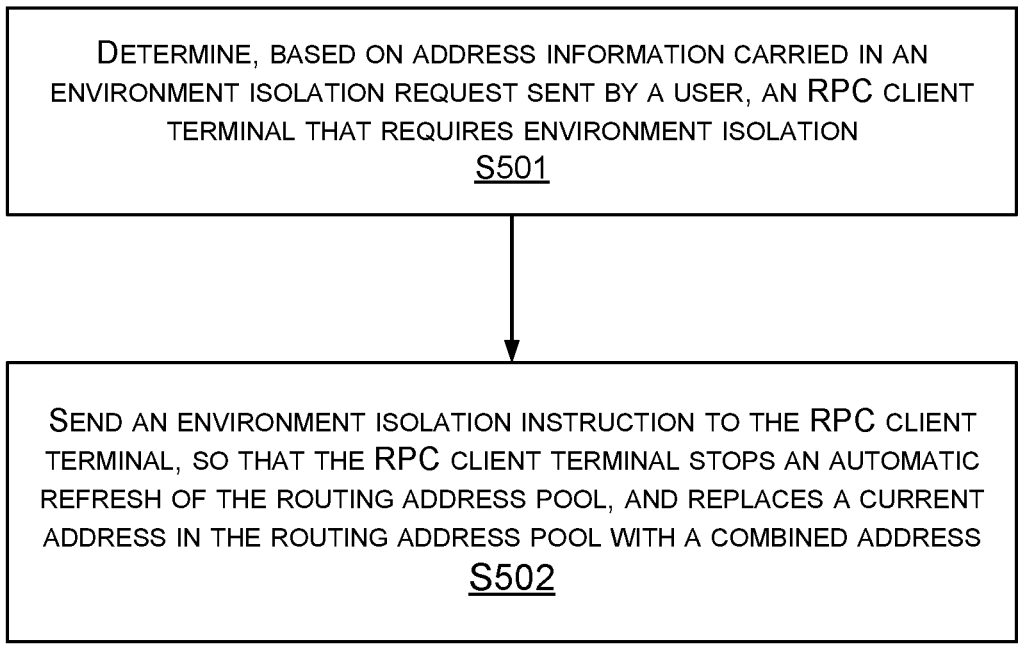
FIG. 5 is a schematic flowchart of another environment isolation method according to an embodiment of the present application.

In the foregoing embodiment, specific implementations and details of environment isolation are elaborated from the perspective of an RPC client terminal. In addition, the present application further provides another environment isolation method from the perspective of an environment isolation device. The method is applied to an environment isolation device, and it needs to be ensured that the environment isolation device is connected to the RPC client terminal (physically or logically). As shown in FIG. 5, the method includes the following steps:

S501. An RPC client terminal that requires environment isolation is determined based on address information carried in an environment isolation request sent by a user, wherein a pre-configured full address in a routing address pool in the RPC client terminal is automatically refreshed according to a preset cycle.

In an embodiment of the present application, the address information is a source IP address and a destination IP address. Based on the two specific IP addresses, in this step, the address information is first extracted from the environment isolation request. Then, an interface of an RPC server terminal is queried to acquire a service requiring environment isolation. Finally, an RPC client terminal corresponding to the source IP address is used as the RPC client terminal that requires environment isolation.

S502. An environment isolation instruction is sent to the RPC client terminal, so that the RPC client terminal stops an automatic refresh of the routing address pool, and replaces a current address in the routing address pool with a combined address, wherein the combined address is generated by the RPC client terminal by combining the current address in the routing address pool and an address in a preset manual address list.

In a normal case, the RPC client terminal in the present application will return a response to the environment isolation device after environment isolation is preliminarily completed. Therefore, to ensure the stability after environment isolation, the environment isolation device may initiate an isolation status check and a downstream service availability check. Corresponding processes are as follows:

(1) Isolation Status Check

An isolation status check instruction is sent to the RPC client terminal if an environment isolation success response sent by the RPC client terminal is received, and a query result returned by the RPC client terminal is returned to the user. The status check instruction is used to instruct the RPC client terminal to query whether an interface between the RPC client terminal and each downstream RPC server terminal is normal, and send the query result to the environment isolation device.

(2) Downstream Service Availability Check

It is detected whether each downstream RPC server terminal of the RPC client terminal is in a normal state if an environment isolation success response sent by the RPC client terminal is received, and it is determined whether the combined address in the routing address pool after screening according to a preset routing rule is null.

A downstream survival security alarm prompt is sent to the user if there is a downstream RPC server terminal in an abnormal state or the combined address in the routing address pool after screening according to the preset routing rule is null.

Finally, when needing to cancel environment isolation, the user can send an environment isolation cancellation request to the environment isolation device. When receiving the environment isolation cancellation request sent by the user, the environment isolation device sends an environment isolation cancellation instruction to the RPC client terminal, so that the RPC client terminal refreshes the combined address in the routing address pool with the full address, and automatically refreshes the pre-configured full address in the routing address pool according to the preset cycle.

It should be noted that the isolation request and the instruction in the isolation process generally may be exchanged by using the Representational State Transfer (REST) protocol. However, a password in the process may be hijacked by a malicious user to send a malicious isolation request. Therefore, in an embodiment of the present application, a timeout period of 30 seconds (the period can be adjusted based on an actual condition) is set by means of Digest authentication, to effectively avoid plaintext transmission of the password and replay attacks, support the client terminal to authenticate the server, and achieve a certain tamper-resistant capability. At the same time, the user password is encrypted to avoid a loss of the user due to a password theft. A Response encryption algorithm is as follows:

1. HA1=MD5 (A1)=MD5 (username: realm: password)
2. HA2=MD5 (A2)=MD5 (method: digestURI: MD5 (entityBody))
3. Response=MD5 (HA1: nonce: nonceCount: client-Nonce: qop: HA2)

Figure 6:
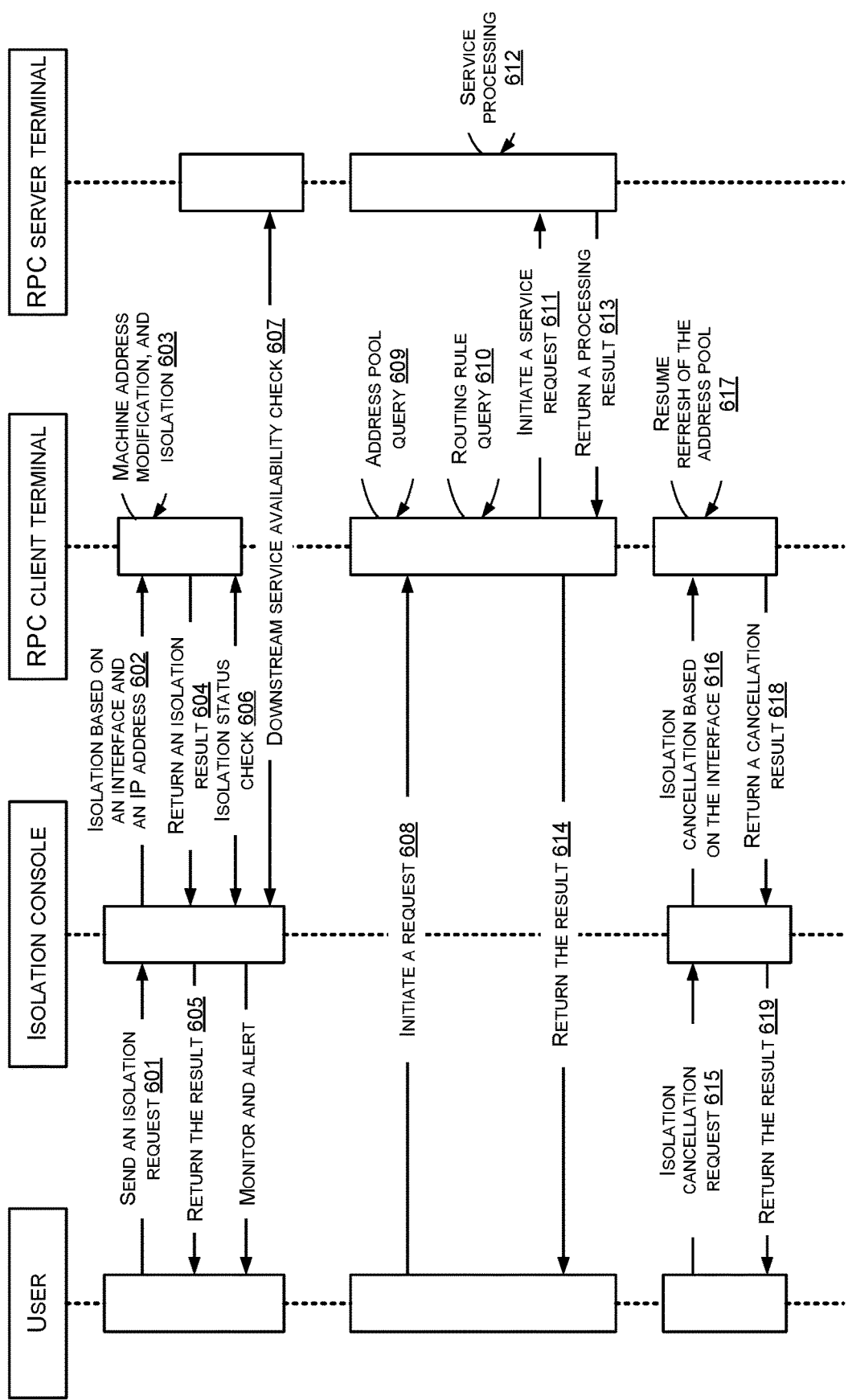
FIG. 6 is a schematic flowchart of isolation according to an embodiment of the present application.

In the foregoing embodiment, how the environment isolation device cooperates with the RPC client terminal to implement environment isolation and implement a service call request of the user after environment isolation is explained. To further explain the technical idea of the present invention, the technical solution of the present invention is described with reference to an application scenario shown in FIG. 6:

Step 601. A user sends an isolation request to an isolation console by using a browser, and provides a source IP address and a destination IP address of isolation to the isolation console.

Step 602. The isolation console queries an interface of a server terminal by using the source IP address and the destination IP address to obtain a service that requires isolation, then initiates, based on the source IP address, an isolation request directed to the RPC client terminal corresponding to the source IP address, and transfers the destination IP parameter.

Step 603. After obtaining the destination IP address transferred in the preceding step, the RPC client terminal stops an automatic refresh of an address pool, and modifies an address in the routing address pool. Specifically, an address in a manually set address list and an address in the original address pool are effectively combined based on an address combination algorithm.

Step 604. The RPC client terminal returns the isolation result to the isolation console.

Step 605. After the preceding step is performed, the isolation console sends a response indicative of a successful or failed execution to the user.

Steps 606 and 607. If the RPC client terminal successfully directs the request routing, the console starts an isolation status check (Step 606) and a downstream survival security check (Step 607). The isolation status check (Step 606) can return a link isolation status, such as isolation on, isolation off, or an abnormal state. The downstream survival security check (Step 607) is to monitor whether a downstream machine is restarted or a final address after screening according to a routing rule is null. This is to prevent downstream unavailability from causing an upstream stability problem and affecting the final user.

Step 608. Environment isolation has been completed by the preceding five steps. In this case, the user can initiate a request to the RPC client terminal. The RPC client terminal obtains combined addresses by querying the routing address pool (Step 609), then obtains a final valid target address after screening the addresses by center, unit, machine room, or other screening rules (a result after combination may be null) (Step 610), and sends a service request of the RPC client terminal to a specified RPC server terminal (Step 611).

Steps 612 and 613. The RPC server terminal processes the request sent from the client terminal (Step 612), and returns a processing result to the RPC client terminal after completing service processing (Step 613).

Step 614. The RPC client terminal displays the result to the user.

Steps 615 and 616. When intending to cancel isolation, the user sends an isolation cancellation request to the isolation console (Step 615); and, based on the source IP address, the isolation console initiates an isolation cancellation request to the RPC client terminal corresponding to the source IP address (Step 616).

Steps 617 and 618. The RPC client terminal resumes refresh in the machine address pool after receiving the cancellation request (Step 617), and returns an execution result to the isolation console (Step 618).

Step 619. After the preceding step is finished, the isolation console sends a response indicative of a successful or failed execution to the user.

Figure 7:
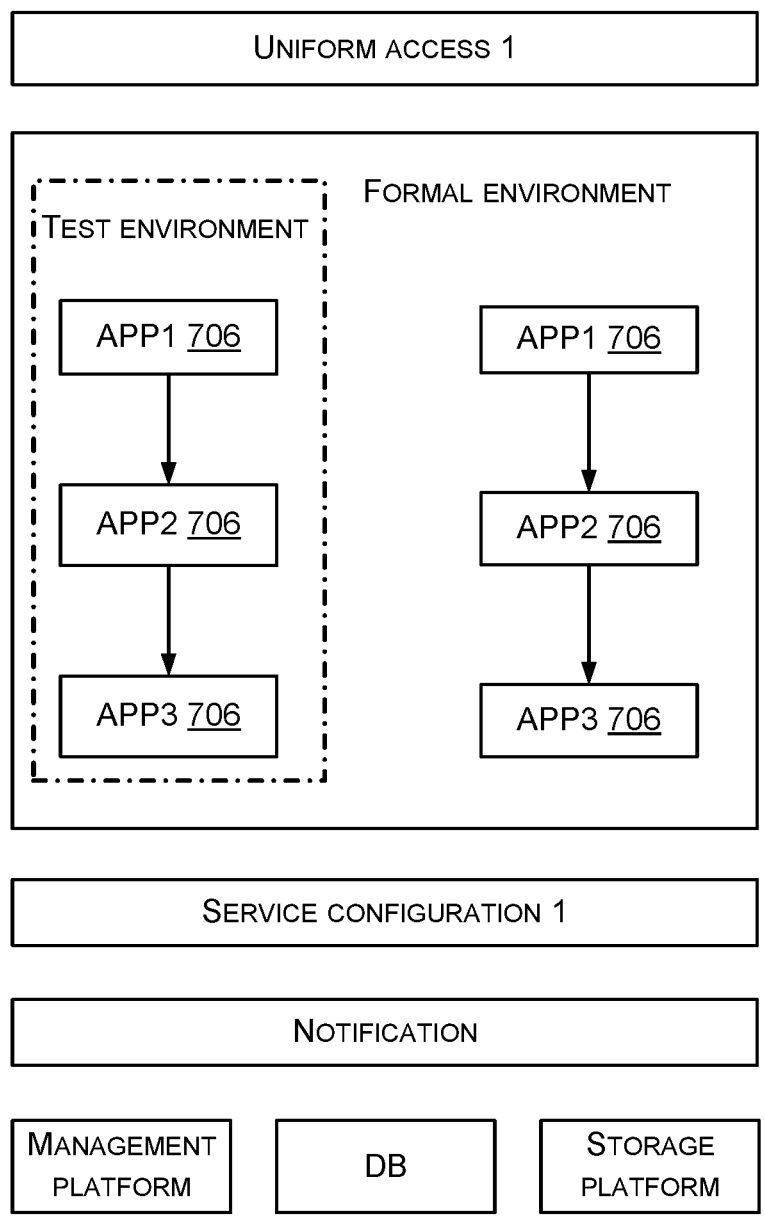
FIG. 7 is an overall architectural diagram of isolation according to an embodiment of the present application.

Based on the process above, the overall architecture of the embodiment described above is as shown in FIG. 7, and has the following features:

1. No modification needs to be made to the APPs (collectively 706).
2. No separate deployment, operation, or maintenance is required.
3. Effects can be achieved in real-time.
4. REST data transmission uses standard Digest authentication with a timeout period of 30 seconds, which effectively avoids plaintext transmission of a password and replay attacks, supports the client terminal to authenticate the server, and achieves a certain tamper-resistant capability.
5. Service status and downstream survival security checks are performed, thereby achieving high stability.
6. Deployment costs are low, and there is no need for support from special routing hardware.
7. Operations are simple, and technical personnel can visually carry out operations through a console, or directly initiate a request by using the REST protocol.
8. Isolation and isolation cancellation are convenient, and isolation cancellation does not require any cleanup work.

Figure 8:
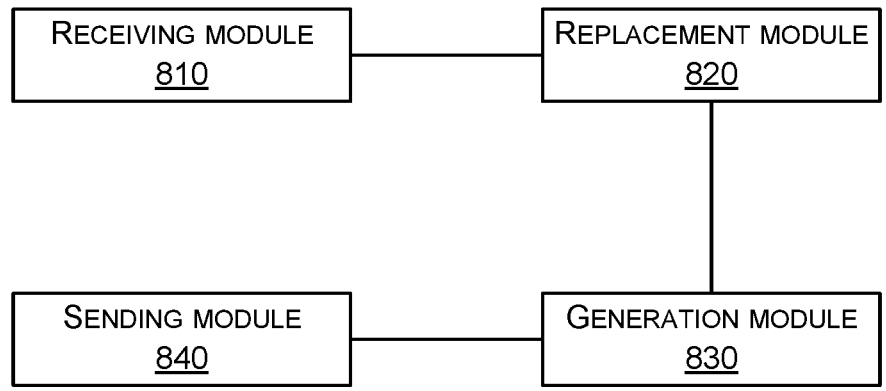
FIG. 8 is a schematic structural diagram of an RPC client terminal according to an embodiment of the present application.

To achieve the foregoing technical objectives, the present application further provides an RPC client terminal. As shown in FIG. 8, the RPC client terminal is connected to a preset environment isolation device, and a pre-configured full address in a routing address pool in the RPC client terminal is automatically refreshed according to a preset cycle. The RPC client terminal further includes:

a receiving module 810 configured to receive an environment isolation instruction sent by the environment isolation device;

a replacement module 820 module configured to stop an automatic refresh of the routing address pool in the RPC client terminal, and replace a current address in the routing address pool with a combined address, wherein the combined address is generated by the RPC client terminal by combining the current address in the routing address pool and an address in a preset manual address list;

a generation module 830 configured to generate a valid target address based on the combined address in the routing address pool when the receiving module receives a service call request sent by a user; and a sending module 840 configured to send the service call request to an RPC server terminal corresponding to the target address, and return to the user a service processing result returned by the RPC server terminal.

In an application scenario, the manual address list includes addresses of an RPC client terminal and an RPC server terminal that participate in environment isolation, and when replacing the current address in the routing address pool with the combined address, the replacement module is configured to:

select a first sub-address that can be used for address combination from the manual address list;

use an address in the routing address pool after automatic refresh is stopped as a second sub-address;

combine the first sub-address and the second sub-address into the combined address based on a preset address combination algorithm; and delete the current address from the routing address pool, and add the combined address to the routing address pool.

In an application scenario, the generation module is configured to:

query a preset routing rule, and query the routing address pool for available device addresses;

screening the found device addresses according to the routing rule;

if there is a device address conforming to the routing rule, use the device address as the target address; or if there is no device address conforming to the routing rule, return a service call failure response to the user.

In an application scenario, the RPC client terminal further includes:

a response module configured to return an environment isolation success response to the environment isolation device; and a query module configured to query whether an interface between the RPC client terminal and each downstream RPC server terminal is normal when an isolation status check instruction sent by the environment isolation device is received, and send a query result to the environment isolation device to cause the environment isolation device to send the query result to the user.

In an application scenario, the RPC client terminal further includes:

a withdrawal module configured to refresh the combined address in the routing address pool with the full address when an environment isolation cancellation instruction sent by the environment isolation device is received, and automatically refresh the pre-configured full address in the routing address pool according to a preset cycle.

Figure 9:
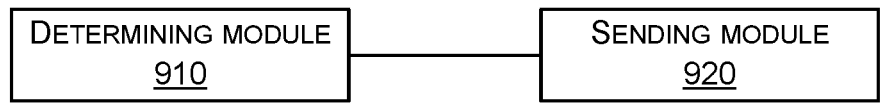
FIG. 9 is a schematic structural diagram of an environment isolation device according to an embodiment of the present application.

Correspondingly, the present application further provides an environment isolation device. As shown in FIG. 9, the environment isolation device is connected to the RPC client terminal, and the environment isolation device includes:

a determining module 910 configured to determine, based on address information carried in an environment isolation request sent by a user, an RPC client terminal that requires environment isolation, wherein a pre-configured full address in a routing address pool in the RPC client terminal is automatically refreshed according to a preset cycle; and a sending module 920 configured to send an environment isolation instruction to the RPC client terminal, so that the RPC client terminal stops an automatic refresh of the routing address pool, and replaces a current address in the routing address pool with a combined address, wherein the combined address is generated by the RPC client terminal by combining the current address in the routing address pool and an address in a preset manual address list.

In an application scenario, the address information is a source IP address and a destination IP address, and the determining module is configured to:

extract the address information from the environment isolation request;

obtain a service requiring environment isolation by querying an interface of an RPC server terminal; and use an RPC client terminal corresponding to the source IP address as the RPC client terminal that requires environment isolation.

In an application scenario, the environment isolation device further includes:

a first detection module configured to send an isolation status check instruction to the RPC client terminal when an environment isolation success response sent by the RPC client terminal is received, and return to the user a query result returned by the RPC client terminal, wherein the status check instruction is used to instruct the RPC client terminal to query whether an interface between the RPC client terminal and each downstream RPC server terminal is normal, and send the query result to the environment isolation device.

In an application scenario, the environment isolation device further includes:

a second detection module configured to detect whether each downstream RPC server terminal of the RPC client terminal is in a normal state when an environment isolation success response sent by the RPC client terminal is received, and determine whether the combined address in the routing address pool after screening according to a preset routing rule is null; and send a downstream survival security alert to the user when there is a downstream RPC server terminal in an abnormal state or the combined address in the routing address pool is null after screening according to the preset routing rule.

In an application scenario, the environment isolation device further includes:

a withdrawal module configured to send an environment isolation cancellation instruction to the RPC client terminal when an environment isolation cancellation request sent by the user is received, so that the RPC client terminal refreshes the combined address in the routing address pool with the full address, and automatically refreshes the pre-configured full address in the routing address pool according to a preset cycle.

By means of the technical solutions of the present application, first, a pre-configured full address in a routing address pool of an RPC client terminal is automatically refreshed according to a preset cycle. The RPC client terminal stops an automatic refresh of the routing address pool after receiving an environment isolation instruction sent by an environment isolation device, and replaces a current address in the routing address pool with a combined address. When subsequently receiving a service call request sent by a user, the RPC client terminal generates a valid target address based on the combined address in the routing address pool, sends the service call request to an RPC server terminal corresponding to the target address, and returns to the user a service processing result returned by the RPC server terminal. As such, problems such as high complexity and incomplete isolation in an RPC call process are resolved without modifying hardware, ensuring the security and stability of the environment isolation.

Figure 10:
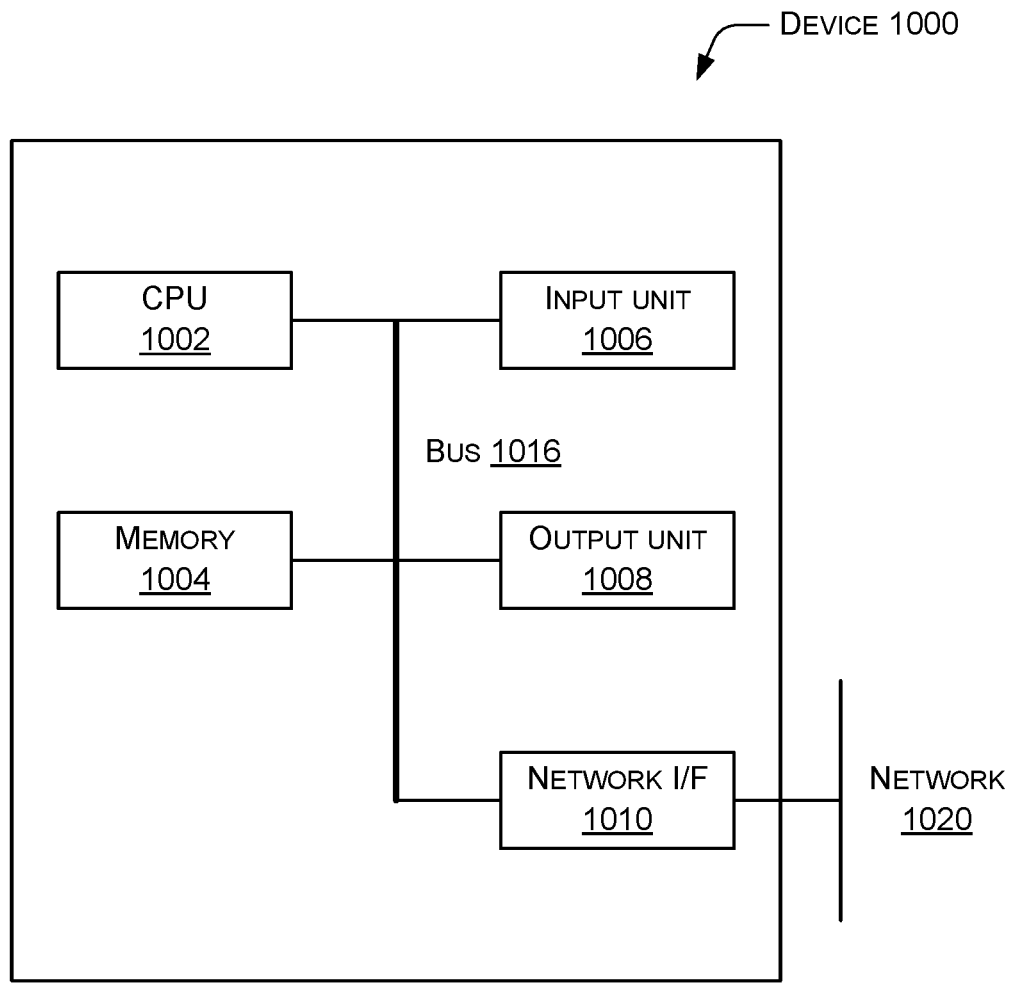
FIG. 10 is a block diagram illustrating an exemplary computer in which embodiments of the invention can be implemented.

FIG. 10 illustrates the exemplary components of a computer 1000 which can be any of the isolation console, RPC client terminal, RPC server terminal described in the embodiments above. The computer 1000 can include a central processing unit (CPU) 1002, memory 1004, an input unit 1006, an output unit 1008, and a network interface 1010, all connected to a bus 1016. The network interface 1010 allows the computer 1000 to connect to a network 1020. The memory 1004 can store the one or more illustrated modules of FIGS. 4 and 7-9 and/or instructions for carrying out the methods disclosed in the embodiments above. The input unit 1006 can receive user input or data. The network interface 1010 allows computer 1010 to communicate with one or more of the other computers on the network.

From the description of the implementations above, a person skilled in the art can clearly understand that the present application may be implemented by hardware, or by software plus a necessary universal hardware platform. Based on such an understanding, the technical solutions in the present application may be implemented in the form of a software product. The software product may be stored in a non-volatile storage medium (which may be a CD-ROM, a USB flash disk, a removable hard disk, or the like), and includes several instructions for instructing a computer device (which may be a personal computer, a server, a network device, or the like) to perform all or some of the steps of the methods described in various implementation scenarios of the present application.

Any other types of computer readable media can also be used for storing the software product. The software product, when executed by a processor, can perform the methods disclosed in the embodiments above. The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In an aspect of the invention, an environment isolation method is disclosed. The method applies to an environment isolation device connected to a Remote Procedure Call (RPC) client terminal. The method includes determining, based on address information carried in an environment isolation request sent by a user, an RPC client terminal that requires environment isolation, wherein a pre-configured full address in a routing address pool in the RPC client terminal is automatically refreshed according to a preset cycle; sending an environment isolation instruction to the RPC client terminal to stop the automatic refresh of the routing address pool; and replacing a current address in the routing address pool with a combined address, wherein the combined address is generated by the RPC client terminal by combining the current address in the routing address pool and an address in a preset manual address list.

In one embodiment, the address information includes a source IP address and a destination IP address. The step of determining, based on address information carried in an environment isolation request sent by a user, an RPC client terminal that requires environment isolation includes extracting the address information from the environment isolation request; acquiring a service requiring environment isolation by querying an interface of an RPC server terminal; and using an RPC client terminal corresponding to the source IP address as the RPC client terminal that requires environment isolation.

In an embodiment, after the step of sending an environment isolation instruction to the RPC client terminal, the method further includes: sending an isolation status check instruction to the RPC client terminal if receiving an environment isolation success response sent by the RPC client terminal, returning to the user a query result returned by the RPC client terminal, wherein the status check instruction is used to instruct the RPC client terminal to query whether an interface between the RPC client terminal and each downstream RPC server terminal is normal, and to send the query result to the environment isolation device.

In an embodiment, after the step of sending an environment isolation instruction to the RPC client terminal, the method further includes: detecting whether each downstream RPC server terminal of the RPC client terminal is in a normal state if an environment isolation success response sent by the RPC client terminal is received; determining whether the combined address in the routing address pool after screening according to a preset routing rule is null; and sending a downstream survival security alert to the user if there is a downstream RPC server terminal in an abnormal state or the combined address in the routing address pool after screening according to the preset routing rule is null.

In an embodiment, after the step of sending an environment isolation instruction to the RPC client terminal, the method further includes: sending an environment isolation cancellation instruction to the RPC client terminal when receiving an environment isolation cancellation request sent by the user, causing the RPC client terminal to refresh the combined address in the routing address pool with the full address; and to automatically refresh the pre-configured full address in the routing address pool according to the preset cycle.

A person skilled in the art can understand that an accompanying drawing is merely a schematic diagram of one implementation scenario, and modules or procedures in the accompanying drawings are not necessarily mandatory to implement the present application.

A person skilled in the art can understand that modules in an apparatus in an implementation scenario may be distributed in the apparatus in the implementation scenario according to the description of the implementation scenario, and may also be correspondingly changed and located in one or more apparatuses different from that in the implementation scenario. The modules in the implementation scenario may be combined into one module, and may also be divided into a plurality of submodules.

The sequence numbers in the present application are merely for the purpose of description, and do not imply the preference among the implementation scenarios.

Disclosed above are merely several specific implementation scenarios of the present application. However, the present application is not limited to the implementation scenarios described above. Any variations that a person skilled in the art can conceive of shall fall in the protection scope of the present application.

What is claimed is:

1. An environment isolation method, applied to a Remote Procedure Call (RPC) client terminal, the method comprising:
   receiving, by the RPC client terminal, an environment isolation instruction from an environment isolation device connected to the RPC client terminal;
   stopping, by the RPC client terminal, an automatic refresh of a routing address pool in the RPC client terminal,
   replacing a current address in the routing address pool with a combined address, wherein the combined address is generated by the RPC client terminal by combining the current address in the routing address pool and an address in a preset manual address list;
   generating, by the RPC client terminal, a valid target address based on the combined address in the routing address pool when receiving a service call request sent by a user;
   sending, by the RPC client terminal, the service call request to an RPC server terminal corresponding to the valid target address; and
   returning to the user a service processing result returned by the RPC server terminal.

2. The method of claim 1, wherein
   the preset manual address list comprises addresses of the RPC client terminal and the RPC server terminal that participate in environment isolation, and
   the step of replacing, by the RPC client terminal, the current address in the routing address pool with the combined address further comprises:
   selecting a first sub-address that can be used for address combination from the manual address list;
   using an address in the routing address pool, after the automatic refresh is stopped, as a second sub-address;
   combining the first sub-address and the second sub-address into the combined address based on a preset address combination algorithm;
   deleting the current address from the routing address pool; and
   adding the combined address to the routing address pool.

3. The method of claim 1, wherein the step of generating, by the RPC client terminal, the valid target address based on the combined address in the routing address pool further comprises:
   querying a preset routing rule;
   querying the routing address pool for available device addresses;
   screening the available device addresses according to the preset routing rule; and
   if there is a device address conforming to the preset routing rule, using the device address as the valid target address; or
   if there is no device address conforming to the preset routing rule, returning a service call failure response to the user.

4. The method of claim 3, wherein screening the available device addresses according to the preset routing rule comprises:
- obtaining the valid target address after screening the available addresses by center, unit, machine room, or other routing rules.

5. The method of claim 1, wherein after the step of replacing, by the RPC client terminal, a current address in the routing address pool with a combined address, the method further comprises:
- returning an environment isolation success response to the environment isolation device;
- querying whether an interface between the RPC client terminal and each downstream RPC server terminal is normal when receiving an isolation status check instruction sent by the environment isolation device; and
- sending a query result to the environment isolation device to cause the environment isolation device to return the query result to the user.

6. The method of claim 1, wherein after the step of replacing, by the RPC client terminal, the current address in the routing address pool with the combined address, the method further comprises:
- refreshing the combined address in the routing address pool with a pre-configured full address if an environment isolation cancellation instruction sent by the environment isolation device is received, and
- resuming the automatic refreshing of the pre-configured full address in the routing address pool according to a preset cycle.

7. The method of claim 1, wherein the environment isolation device connected to the RPC client terminal is preset.

8. The method of claim 1, wherein a pre-configured full address in the routing address pool in the RPC client terminal is automatically refreshed according to a preset cycle.

9. The method of claim 1, wherein the environment isolation instruction is transmitted using a Representational State Transfer (REST) protocol.

10. The method of claim 1, wherein the environment isolation instruction is transmitted using standard Digest authentication with a timeout period of 30 seconds.

11. A Remote Procedure Call (RPC) client terminal connected to a preset environment isolation device, the RPC client terminal comprising:
- a receiving module configured to receive an environment isolation instruction sent by the environment isolation device;
- a replacement module configured to stop an automatic refresh of a routing address pool in the RPC client terminal and replace a current address in the routing address pool with a combined address, wherein the combined address is generated by the RPC client terminal by combining the current address in the routing address pool and an address in a preset manual address list;
- a generation module configured to generate a valid target address based on the combined address in the routing address pool when the receiving module receives a service call request sent by a user; and
- a sending module configured to send the service call request to an RPC server terminal corresponding to the valid target address, and return to the user a service processing result returned by the RPC server terminal;
- wherein a pre-configured full address in the routing address pool in the RPC client terminal is automatically refreshed according to a preset cycle.

12. The RPC client terminal of claim 11, wherein the preset manual address list comprises addresses of the RPC client terminal and the RPC server terminal that participate in environment isolation, and when replacing the current address in the routing address pool with the combined address, the replacement module is configured to:
- select a first sub-address that can be used for address combination from the manual address list;
- use an address in the routing address pool, after the automatic refresh is stopped, as a second sub-address;
- combine the first sub-address and the second sub-address into the combined address based on a preset address combination algorithm; and
- delete the current address from the routing address pool, and add the combined address to the routing address pool.

13. The RPC client terminal of claim 11, wherein the generation module is configured to:
- query a preset routing rule, and query the routing address pool for available device addresses;
- screening the found device addresses according to the preset routing rule; and
- if there is a device address conforming to the preset routing rule, use the device address as the valid target address; or
- if there is no device address conforming to the preset routing rule, return a service call failure response to the user.

14. The RPC client terminal of claim 11, further comprising:
- a response module configured to return an environment isolation success response to the environment isolation device;
- a query module configured to query whether an interface between the RPC client terminal and each downstream RPC server terminal is normal when an isolation status check instruction sent by the environment isolation device is received; and
- send a query result to the environment isolation device to cause the environment isolation device to return the query result to the user.

15. The RPC client terminal of claim 11, further comprising:
- a withdrawal module configured to refresh the combined address in the routing address pool with a pre-configured full address when an environment isolation cancellation instruction sent by the environment isolation device is received, and resuming the automatic refresh of the pre-configured full address in the routing address pool according to a preset cycle.

16. An environment isolation device connected to a Remote Procedure Call (RPC) client terminal, and the environment isolation device comprises:
- a determining module configured to determine, based on address information carried in an environment isolation request sent by a user, an RPC client terminal that requires environment isolation, wherein a pre-configured full address in a routing address pool in the RPC client terminal is automatically refreshed according to a preset cycle; and
- a sending module configured to send an environment isolation instruction to the RPC client terminal, thereby causing the RPC client terminal to stop an automatic refresh of the routing address pool, and replace a current address in the routing address pool with a combined address, wherein the combined address is generated by the RPC client terminal by combining the current address in the routing address pool and an address in a preset manual address list.

17. The environment isolation device of claim 16, wherein the address information comprises a source IP address and a destination IP address, and the determining module is configured to:
 extract the address information from the environment isolation request;
 acquire a service requiring environment isolation by querying an interface of an RPC server terminal; and
 use an RPC client terminal corresponding to the source IP address as the RPC client terminal that requires environment isolation.

18. The environment isolation device of claim 16, further comprising:
 a first detection module configured to
  send an isolation status check instruction to the RPC client terminal when an environment isolation success response sent by the RPC client terminal is received, and
  return to the user a query result returned by the RPC client terminal, wherein the status check instruction is used to instruct the RPC client terminal to query whether an interface between the RPC client terminal and each downstream RPC server terminal is normal, and
  send the query result to the environment isolation device.

19. The environment isolation device of claim 16, further comprising:
 a second detection module configured to
  detect whether each downstream RPC server terminal of the RPC client terminal is in a normal state when an environment isolation success response sent by the RPC client terminal is received, and determine whether the combined address in the routing address pool, after screening according to a preset routing rule, is null; and
  send a downstream survival security alert to the user when there is a downstream RPC server terminal in an abnormal state or the combined address in the routing address pool after screening according to the preset routing rule is null.

20. The environment isolation device of claim 16, further comprising:
 a withdrawal module configured to send an environment isolation cancellation instruction to the RPC client terminal when an environment isolation cancellation request sent by the user is received, so that the RPC client terminal refreshes the combined address in the routing address pool with the pre-configured full address, and resume automatic refresh of the pre-configured full address in the routing address pool according to the preset cycle.

* * * * *